US010036863B2

(12) United States Patent
Debban et al.

(10) Patent No.: US 10,036,863 B2
(45) Date of Patent: Jul. 31, 2018

(54) OPTICAL FIBER CABLES WITH FLAT RIBBON FIBERS

(71) Applicant: OFS Fitel, LLC, Norcross, GA (US)

(72) Inventors: Harold P Debban, Snellville, GA (US); Heng Ly, Stone Mountain, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/216,780

(22) Filed: Jul. 22, 2016

(65) Prior Publication Data

US 2017/0023754 A1 Jan. 26, 2017

Related U.S. Application Data

(60) Provisional application No. 62/195,606, filed on Jul. 22, 2015.

(51) Int. Cl.
*G02B 6/44* (2006.01)
(52) U.S. Cl.
CPC ........... *G02B 6/441* (2013.01); *G02B 6/4403* (2013.01); *G02B 6/4433* (2013.01); *G02B 6/4434* (2013.01); *G02B 6/4494* (2013.01)

(58) Field of Classification Search
CPC .... G02B 6/441; G02B 6/4434; G02B 6/4433; G02B 6/4403; G02B 6/4494
USPC .......................................... 385/100, 110, 147
See application file for complete search history.

(56) References Cited

U.S. PATENT DOCUMENTS

| 4,565,351 | A | * | 1/1986 | Conti | G02B 6/4459 138/108 |
| 4,744,631 | A | * | 5/1988 | Eichenbaum | G02B 6/4411 385/114 |
| 6,215,932 | B1 | * | 4/2001 | Hardwick, III | G02B 6/4411 385/109 |
| 6,487,348 | B1 | * | 11/2002 | Jackson | G02B 6/4411 385/104 |
| 2002/0122640 | A1 | * | 9/2002 | Strong | G02B 6/4411 385/114 |
| 2011/0091171 | A1 | * | 4/2011 | Tatat | G02B 6/441 385/105 |

* cited by examiner

*Primary Examiner* — Akm Enayet Ullah
(74) *Attorney, Agent, or Firm* — Sam S. Han, Esq.

(57) ABSTRACT

An optical fiber cable comprising a duct space and a fiber density in the duct space. The fiber density is greater than 2.3 fibers/mm$^2$.

8 Claims, 2 Drawing Sheets

OPTICAL FIBER CABLES WITH FLAT RIBBON FIBERS

CROSS REFERENCE TO RELATED APPLICATIONS

This application claims the benefit of U.S. provisional patent application Ser. No. 62/195,606, filed 2015 Jul. 22, by Debban, having the title "High Density Fiber Cable," which is incorporated herein by reference in its entirety.

BACKGROUND

Field of the Disclosure

The present disclosure relates generally to fiber optics and, more particularly, to optical fiber cables.

Description of Related Art

Recent demands for increased data capacity have been met with installation of high-capacity optical fiber cables. Despite these ongoing efforts to meet the increasing demands, there still exists an unaddressed need in the industry for higher density optical fiber cables.

SUMMARY

The present disclosure provides for high-density optical fiber cables.

Briefly described, in architecture, one embodiment is a cable comprising a duct, the space under the outer sheath of the cable (also referred to herein as "duct space"), and a fiber density in the duct space that is greater than 2.3 fibers/mm$^2$.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
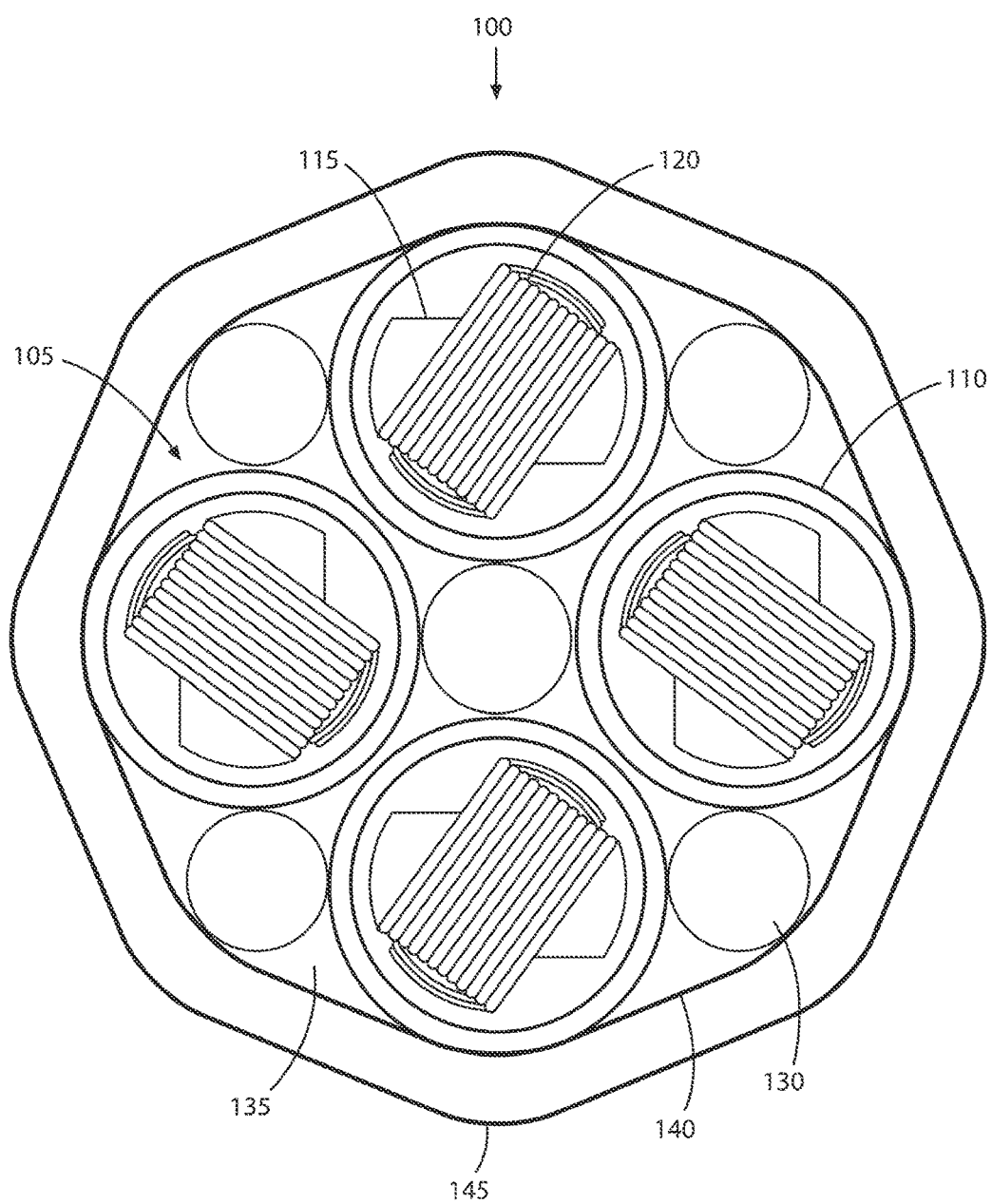
FIG. 1 is a diagram showing a cross-section of one embodiment of a high-density optical fiber cable.

Currently, high density optical fiber cables are manufactured using slotted core ribbons, rollable ribbons, or micro module cables, all of which are known in the art. However, each of these manufacturing methods have their drawbacks. For example, micro module cables contain loose optical fibers and cannot be mass fusion spliced without a time-consuming field ribbonization step, thereby limiting the desirability of such cables. Slotted core ribbon cables are expensive and must be manufactured with special equipment, while rollable ribbons are difficult to procure and manufacture. Furthermore, all of these cables typically use 250 µm optical fibers, which have a coating that is approximately 250 µm in diameter. Using 250 µm optical fibers limits the fiber density that is achievable in any given cable. As is known, the 250 µm optical fibers have a 125 µm-diameter cladding surrounded by a 62.5 µm-thick coating, which brings the total diameter to approximately 250 µm. The 62.5 µm-thick coating is typically required because a thinner coating results in undesirable bend sensitivity and higher attenuation. In other words, conventional wisdom counsels against reducing the thickness of the coating because such a reduction causes undesirable results. Consequently, high density optical fiber cables have fiber densities that are less than 1.8 fibers/mm$^2$ within their duct space, where the "duct space" for the optical fibers in a cable is defined herein as the space under the outer sheath structure of the cable, where the sheath structure includes the outer jacket and any armoring or peripheral reinforcement.

The disclosed embodiments achieve higher fiber densities in optical fiber cables by doing precisely what conventional wisdom counsels against, namely, by using 200 µm optical fibers that have coatings that are approximately 40% thinner than conventional 250 µm optical fibers. By using 200 µm optical fibers in flat optical ribbons, the disclosed cables achieve fiber densities that are greater than 2.3 fibers/mm$^2$, or densities that are approximately 65% higher than conventional cable constructions. For example, as explained in greater detail below, more than a thousand (e.g., 1,152) optical fibers can be packed into a duct space that is less than 25 mm in diameter (e.g., 23 mm or 24 mm diameter duct space). Such high fiber densities are achieved, for example, by using ribbon stacks (e.g., four (4) ribbon stacks with each ribbon stack comprising twelve (12) flat 24-fiber ribbons, or eight (8) ribbon stacks with each ribbon stack comprising twelve (12) flat 12-fiber ribbons, etc.) in a ribbon-in-loose-tube (RILT) structure.

Having provided a general description of the inventive solution for a high-density optical fiber cable, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing a cross-section of one embodiment of a high-density RILT optical fiber cable 100. Specifically, the embodiment of FIG. 1 has a duct space 105 that has a 23 mm-diameter and a fiber density that is greater than 2.7 fibers/mm$^2$.

As shown in FIG. 1, this embodiment of the RILT optical fiber cable 100 comprises four (4) buffer tubes 110 that are aligned substantially parallel to each other. Preferably, each buffer tube 110 has a diameter of 8 mm. Within the buffer tubes 110 are ribbon stacks 115 (also designated as stacks of ribbons). For example, the first buffer tube has a corresponding ribbon stack, the second buffer tube has a corresponding ribbon stack, and so on. Those having skill in the art will appreciate that, optionally, each ribbon stack exhibits a slight helical twist along the length of the stack. This helical twist may be continuous in one direction, or a reverse oscillating twist. The buffer tubes 110 are also typically helically twisted with a continuous or reverse-oscillating twist to average strain across the tubes and keep any individual tube from being put into compression or tension during installation or storage.

Each ribbon stack 115 comprises twelve (12) flat ribbons 120, preferably, with each stack being contained within a color-coded or otherwise distinctly identified tube to distinguish one stack from another. For the specific embodiment of FIG. 1, each flat ribbon 120 comprises twenty-four (24) 200 μm optical fibers (also designated as a flat 24-fiber ribbon). Thus, for the embodiment of FIG. 1, there are 288 fibers per buffer tube 110. For clarity, a 200 μm optical fiber comprises a coating that has an approximately-200 μm outer diameter. Thus, for example, a 200 μm optical fiber may be an optical fiber with a 125 μm-diameter cladding with a 37.5 μm-thick coating. It should be appreciated that the fiber density is ultimately affected by the outer diameter of the coating, irrespective of the actual cladding diameter or the index profile of the fiber.

Continuing with FIG. 1, interposed between the buffer tubes 110, and aligned with the twisted buffer tubes 110, are a filler rods 130a, 130b (collectively, "130"), namely, a central filler rod 130a that acts as a strength member for the cable 100, and non-central filler rods 130b that provide the cable 100 with a substantially round shape. Water blocking material 135, which keeps dry the other internal components (e.g., filler rods 130, buffer tubes 110, ribbon stack 115), also occupies the duct space 105.

Dielectric strength elements 140 (e.g., aramid yarn, fiberglass yarn, or similar flexible reinforcements) may be wound around the internal components to provide additional strength to the cable 100. Thereafter, the entire cable 100 is protected with an outer jacket 145, which can be applied using conventional cabling processes. It should be appreciated that an optional dielectric inner jacket or an optional armored jacket can be applied before the placement of the outer jacket 145.

As shown in FIG. 1, the 23 mm-diameter duct space 105 results in a cross-sectional area of approximately 415.5 mm$^2$. Insofar as the duct space 105 has 1,152 optical fibers, the embodiment of FIG. 1 has a fiber density that is greater than 2.7 fibers/mm$^2$, which is approximately 60% higher than conventional cables that use 250 μm optical fibers.

As noted above, 200 μm optical fibers exhibit higher attenuation and greater bend sensitivity. These drawbacks can be abated in large part by changing the optical waveguide design or by increasing the thickness of the ribbon coating (to compensate for the reduced thickness of the fiber coating). Alternatively, and preferably, a combination of optimized waveguide properties and optimized ribbon coating thicknesses can be used to substantially overcome the effects of the reduced fiber coating thickness.

Figure 2:
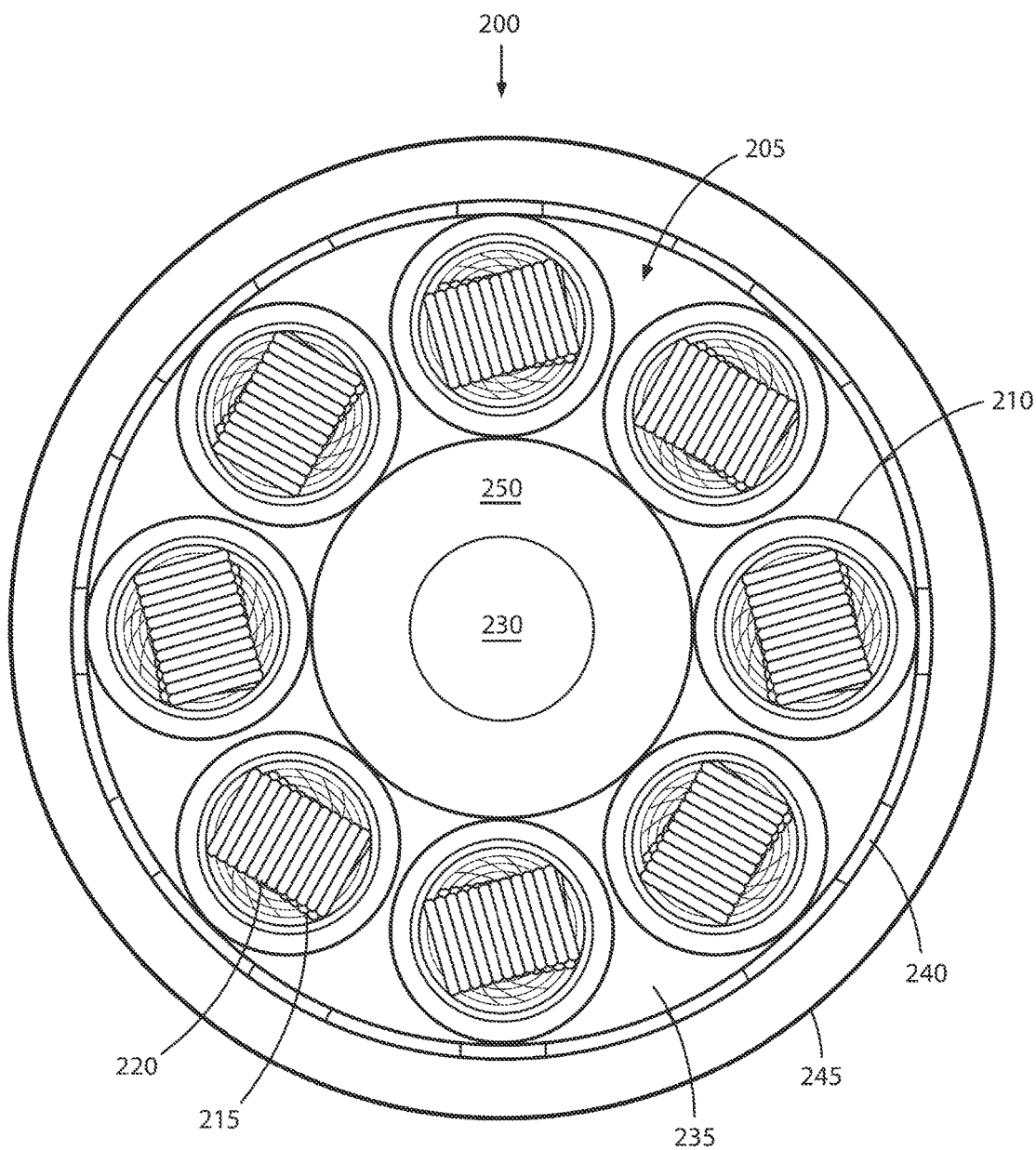
FIG. 2 is a diagram showing a cross-section of another embodiment of a high-density optical fiber cable.

FIG. 2 is a diagram showing a cross-section of another embodiment of a high-density RILT optical fiber cable 200. Specifically, the embodiment of FIG. 2 has a duct space 205 that has a 24 mm-diameter and a fiber density that is greater than 2.5 fibers/mm$^2$.

As shown in FIG. 2, this embodiment of the RILT optical fiber cable 200 comprises eight (8) buffer tubes 210 that are helically twisted together. Preferably, each buffer tube 210 has a diameter of 5.5 mm. Within the buffer tubes 210 are ribbon stacks 215 (e.g., the first buffer tube has a corresponding ribbon stack, the second buffer tube has a corresponding ribbon stack, etc.). Each ribbon stack 215 comprises twelve (12) flat ribbons 220. Preferably, each flat ribbon 220 comprises twelve (12) 200 μm optical fibers (also designated as a flat 12-fiber ribbon). Thus, for the embodiment of FIG. 2, there are 144 fibers per buffer tube 210.

The duct space 205 also includes a central member 230 covered by a central member jacket 250, thereby providing strength to the cable 200. The central member 230 is located substantially in the center of the duct space 205 and aligned substantially parallel to the buffer tubes 210. Within the duct space 205, the cable 200 further comprises water blocking material 235, which surrounds the jacketed central member 230, 250, and the buffer tubes 210. Similar to FIG. 1, dielectric strength elements 240 (e.g., aramid yarn) may be wound around the internal components to provide additional strength, and the cable 200 is protected with an outer jacket 245, which can be applied using conventional cabling processes.

The 24 mm-diameter duct space 205 results in a cross-sectional area of approximately 452.4 mm$^2$. Insofar as the duct space 205 has 1,152 optical fibers, the embodiment of FIG. 2 has a fiber density that is greater than 2.5 fibers/mm$^2$.

As shown in FIGS. 1 and 2, using ribbons stacks with 200 μm optical fibers results in fiber densities that are greater than 2.3 fibers/mm$^2$, allowing more than 1,000 optical fibers to be cabled in a RILT configuration within a 25 mm-diameter duct space.

Although exemplary embodiments have been shown and described, it will be clear to those of ordinary skill in the art that a number of changes, modifications, or alterations to the disclosure as described may be made.

For example, using ribbon stacks with 200 μm optical fibers allows up to 432 fibers (i.e., eighteen (18) flat 24-fiber ribbons) to fit in a conventional central tube fiber sheath, which has a tube diameter of 10.4 mm and an outer diameter of 16.5 mm. For other embodiments, the tube diameter in a central tube cable can be reduced to 9 mm, along with a corresponding reduction in outer diameter to 15.1 mm, and still fit up to 288 fibers (i.e., twelve (12) flat 24-fiber ribbons). These higher fiber densities can be applied to cables having fiberglass reinforced inner jackets, armored jackets, or other conventional jackets. Furthermore, the outer diameter of the cable can be further reduced by substituting more wires with smaller diameters as strength members. All such changes, modifications, and alterations should therefore be seen as within the scope of the disclosure.

What is claimed is:

1. A cable, comprising:
   an outer jacket;
   a duct space internal to the outer jacket;
   a longitudinal strength member located within the duct space;
   a first buffer tube aligned with the longitudinal strength member, the first buffer tube being located within the duct space;
   a first stack of flat ribbons located within the first buffer tube, the first stack comprising 200 μm optical fibers;
   a second buffer tube aligned with the longitudinal strength member, the second buffer tube being located within the duct space; and
   a second stack of flat ribbons located within the second buffer tube, the second stack comprising 200 μm optical fibers.

2. The cable of claim 1, further comprising a fiber density in the duct space that is greater than 2.3 fibers/mm$^2$, the duct space having a diameter that is less than 25 mm.

3. The cable of claim 1, further comprising a fiber density in the duct space that is greater than 2.7 fibers/mm$^2$, the duct space having a diameter that is less than 23 mm.

4. The cable of claim 1, further comprising a fiber density in the duct space that is greater than 2.5 fibers/mm$^2$, the duct space having a diameter that is less than 24 mm.

5. The cable of claim 1, further comprising:
   a third buffer tube aligned with the longitudinal strength member, the third buffer tube being located within the duct space;

a third stack of flat ribbons located within the third buffer tube, the third stack comprising 200 μm optical fibers;
a fourth buffer tube aligned with the longitudinal strength member, the fourth buffer tube being located within the duct space;
a fourth stack of flat ribbons located within the fourth buffer tube, the fourth stack comprising 200 μm optical fibers.

6. The cable of claim 5, wherein:
the first stack comprises 12 flat ribbons with each flat ribbon comprising 24 optical fibers, each optical fiber having a coating with an outer diameter of approximately 200 μm;
the second stack comprises 12 flat ribbons with each flat ribbon comprising 24 optical fibers, each optical fiber having a coating with an outer diameter of approximately 200 μm;
the third stack comprises 12 flat ribbons with each flat ribbon comprising 24 optical fibers, each optical fiber having a coating with an outer diameter of approximately 200 μm; and
the fourth stack comprises 12 flat ribbons with each flat ribbon comprising 24 optical fibers, each optical fiber having a coating with an outer diameter of approximately 200 μm.

7. The cable of claim 5, further comprising:
a fifth buffer tube aligned with the longitudinal strength member, the fifth buffer tube being located within the duct space;
a fifth stack of flat ribbons located within the fifth buffer tube, the fifth stack comprising 200 μm optical fibers;
a sixth buffer tube aligned with the longitudinal strength member, the sixth buffer tube being located within the duct space;
a sixth stack of flat ribbons located within the sixth buffer tube, the sixth stack comprising 200 μm optical fibers;
a seventh buffer tube aligned with the longitudinal strength member, the seventh buffer tube being located within the duct space;
a seventh stack of flat ribbons located within the seventh buffer tube, the seventh stack comprising 200 μm optical fibers;
a eighth buffer tube aligned with the longitudinal strength member, the eighth buffer tube being located within the duct space; and
a eighth stack of flat ribbons located within the eighth buffer tube, the eighth stack comprising 200 μm optical fibers.

8. The cable of claim 7, wherein:
the first stack comprises 12 ribbons with each flat ribbon comprising 12 optical fibers, each optical fiber having a coating with an outer diameter of approximately 200 μm;
the second stack comprises 12 ribbons with each flat ribbon comprising 12 optical fibers, each optical fiber having a coating with an outer diameter of approximately 200 μm;
the third stack comprises 12 ribbons with each flat ribbon comprising 12 optical fibers, each optical fiber having a coating with an outer diameter of approximately 200 μm; and
the fourth stack comprises 12 ribbons with each flat ribbon comprising 12 optical fibers, each optical fiber having a coating with an outer diameter of approximately 200 μm;
the fifth stack comprises 12 ribbons with each flat ribbon comprising 12 optical fibers, each optical fiber having a coating with an outer diameter of approximately 200 μm;
the sixth stack comprises 12 ribbons with each flat ribbon comprising 12 optical fibers, each optical fiber having a coating with an outer diameter of approximately 200 μm;
the seventh stack comprises 12 ribbons with each flat ribbon comprising 12 optical fibers, each optical fiber having a coating with an outer diameter of approximately 200 μm; and
the eighth stack comprises 12 ribbons with each flat ribbon comprising 12 optical fibers, each optical fiber having a coating with an outer diameter of approximately 200 μm.

\* \* \* \* \*